March 14, 1961  J. NAAB  2,975,010

HOLLOW PISTONS

Filed Aug. 26, 1959

INVENTOR
JULIUS NAAB
BY
HIS ATTORNEY

United States Patent Office 2,975,010
Patented Mar. 14, 1961

2,975,010

HOLLOW PISTONS

Julius Naab, Easton, Pa., assignor to Ingersoll-Rand Company, New York, N.Y., a corporation of New Jersey Filed Aug. 26, 1959, Ser. No. 836,217

4 Claims. (Cl. 309—4)

This invention relates to unitary cast hollow pistons for compressors of the type subject to elevated pressures both on the outward stroke and the return stroke thereof.

Unitary cast hollow pistons of this type have core openings in at least one end wall thereof for supporting the core during casting. These openings are tapped and plugged during the machining operations. During operation of the compressor there may be a slow leakage of air or gas past the plugs at elevated pressures. When opening the cylinder and removing the piston to work on the compressor, the piston becomes a pressure chamber having high pressures entrapped therein. If this trapped pressure is not released, there is a possibility of explosion. This situation may be alleviated in many ways however each have drawbacks. A small bleed hole may be drilled into one of the side walls to prevent the pressure within the piston from becoming entrapped, however, during the operation of the compressor there would be a wash of pressure fluid into and out of the piston chamber. Check valves have been suggested, however, these would be relatively large and costly. The plugs that are inserted in the core openings in the end walls are locked and continuous opening and closing of these holes would create a sealing and locking problem. This problem of having removable plugs in the core openings which are locked therein is greatly amplified as the speed of the compressors increases in that aluminum pistons are replacing the cast iron ones.

It is an object of this invention to provide venting means for unitary cast hollow compressor pistons to release entrapped pressures in the pistons when working on the compressor.

Figure 1:
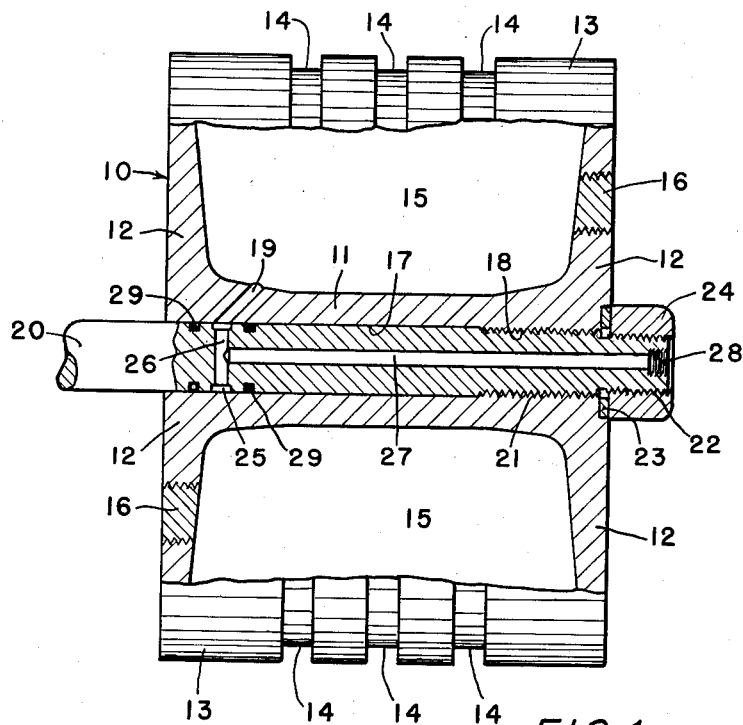
Figure 2:
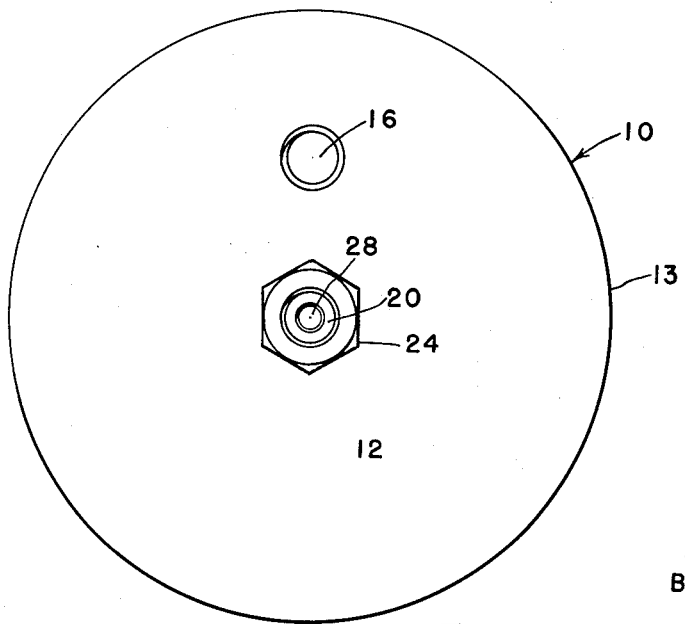

This and other objects will become apparent by referring to the following description and accompanying drawings in which:

Figure 1 is an elevational view in partial section of a piston and the associated piston rod in accordance with the invention, and Fig. 2 is an end view of Fig. 1.

Referring now to the drawings, a unitary cast hollow piston 10 has a hub 11 with outwardly extending end walls 12 and a peripheral cylindrical wall 13 including the usual annular grooves 14 for the reception of piston rings (not shown). The wall portions 12 and 13 with the hub 11 form a piston shell which defines an annular chamber 15 within the piston 10. Core openings in the walls 12 are tapped to receive a plug 16 which is sealed and locked therein in any well known manner. The hub 11 has an axial bore 17 to receive a piston rod 20 and has a threaded end 18 to engage a threaded end portion 21 of the rod 20. A small passage or port 19 is drilled through the hub 11 venting the annular chamber 15 to the bore 17.

The rod 20 has a reduced threaded tip portion 22 to receive a washer 23 and a nut 24 for locking the piston 10 and the rod. The bore 17 in the hub 11 and the piston rod 20 are slightly tapered toward the threaded ends thereof to limit the position of the piston 10 on the rod 20. The piston rod 20 has an annular groove 25 which when the piston head 10 is mounted on the rod will coincide with the drilled passage 19 in the hub portion 11 of the piston. A passage 26 is drilled transversely through the piston rod 20 and in the area of the annular groove 25 and a second passage 27 is drilled axially through the end of the piston rod and intersects the passage 26. The end of the passage 27 remote from the passage 26 is tapped to receive a threaded plug 28. Disposed on either side of the annular groove 25 are annular grooves which receive O-ring seals 29 which bear against the bore 17 of the hub 11 to prevent pressure leakage along the surface of the piston rod 20.

When the compressor is to be disassembled for work or repairs, the head is removed from the cylinder and the plug 28 is extracted from the rod 20. This permits pressure entrapped within the cavity 15 to escape to atmosphere via the passage 19, the annular groove 25, the transverse passage 26 and the axial passage 27. When pressure has escaped, the plug 28 may again be inserted into the end of the passage 27 and drawn tight to prevent loosening when the compressor is in operation.

Having described my invention, I claim:

1. In combination, a hollow piston having a hub with a bore therethrough for receiving a rod, and a rod received in the bore and retained against movement relative to said piston, said hub having a vent passage connecting the chamber in the hollow piston and the bore, said rod having a passage communicating with the vent passage, and means adapted to seal the passage in said rod to close the chamber in said piston.

2. The combination as claimed in claim 1, and said rod having annular groove in communication with the vent passage and the passage in such rod.

3. A compressor piston having an annular chamber therein and a hub, said hub having a bore and a vent passage connecting the annular chamber and the bore, a rod received in the bore and having an axial passage, said rod having a transverse passage connecting the vent passage to the axial passage, and means disposed in the axial passage to seal the annular chamber from pressures surrounding the piston.

4. A piston made of cast material having a hub, end walls extending from said hub and being subject to pressure fluids, and an annular wall connecting said end walls and closing an annular chamber in said piston, one of said walls having at least one opening therein being sealed against the pressure fluids, said hub portion having a bore and a port connecting the annular chamber and the bore, a rod received in the bore and held against movement relative to said piston, said rod having a passage communicating with the port and the pressure fluids surrounding said piston, and means engaging said rod to close the passage and isolate the chamber in said piston.

References Cited in the file of this patent

FOREIGN PATENTS 123,147   Great Britain _____ Feb. 11, 1919